United States Patent [19]
George

[11] 3,855,050
[45] *Dec. 17, 1974

[54] METAL STRUCTURES WHICH ARE SELF-DESTRUCTIBLE BY CHEMICAL CORROSION

[75] Inventor: Percy F. George, Midland, Mich.

[73] Assignee: The Dow Chemical Company, Midland, Mich.

[ * ] Notice: The portion of the term of this patent subsequent to Oct. 9, 1990, has been disclaimed.

[22] Filed: Feb. 22, 1973

[21] Appl. No.: 334,892

Related U.S. Application Data

[62] Division of Ser. No. 16,725, March 5, 1970, Pat. No. 3,744,664.

[52] U.S. Cl................. 161/165, 161/213, 161/216, 161/218, 161/220, 161/225, 161/227
[51] Int. Cl..... B32b 15/04, B32b 15/12, B65d 7/22
[58] Field of Search .......... 161/165, 216, 213, 220, 161/225, 229, 228, 227, 218

[56] References Cited
UNITED STATES PATENTS
3,772,139 11/1973 George ............................... 161/225
3,764,459 10/1973 George ............................... 161/225
3,308,046 3/1967 Suleski ................................ 204/196

Primary Examiner—George F. Lesmes
Assistant Examiner—Ellis P. Robinson
Attorney, Agent, or Firm—V. Dean Clausen; William R. Norris

[57] ABSTRACT

A metal laminate is provided which will deteriorate, at least in part, after the interior of the laminate is contacted by moisture. Self-destructible containers are fabricated of this structural laminate. The laminate includes at least two metal layers. Preferably, both layers are comprised of the same metal. Positioned between the metal layers is at least one layer of a composition capable of chemically corroding the metal layers when the composition is contacted with moisture. A preferred metal-corroding composition is an inorganic salt, such as ammonium chloride.

9 Claims, 2 Drawing Figures

PATENTED DEC 17 1974  3,855,050

METAL STRUCTURES WHICH ARE SELF-DESTRUCTIBLE BY CHEMICAL CORROSION

CROSS REFERENCE TO RELATED APPLICATION

This application is a division of U.S. Ser. No. 16,725, filed Mar. 5, 1970, now U.S. Pat. No. 3,744,664.

BACKGROUND OF THE INVENTION

The invention relates broadly to self-destructible metal structures comprising two or more metal layers and one or more layers of a metal-corroding composition positioned between each pair of metal layers. A specific embodiment of the invention concerns a metal container fabricated of such a structural laminate.

Most non-returnable metal containers in use today require a relatively long period of time to deteriorate when the container is discarded. With millions of such containers being discarded each day, the problem of sufficient space to dispose of the refuse is one of growing concern. It would be desirable, therefore, to provide a metal container which after being opened would deteriorate within a few months in an outdoor environment.

OBJECTS

Accordingly, a principal object of the invention is a self-destructible metal laminate suitable for the fabrication of containers, particularly containers which after being opened will deteriorate substantially more rapidly than the prior metal containers.

A more specific object is a metal container fabricated from a laminate comprising metal layers and a metal-corroding composition, particularly a container which will undergo deterioration, aided by chemical corrosion, upon contacting the metal-corroding composition with moisture.

SUMMARY OF THE INVENTION

Broadly, the invention provides a structural metal laminate useful for the fabrication of metal containers, which laminate undergoes corrosive deterioration upon contacting the interior of the laminate with moisture. A specific embodiment of the invention contemplates a container in which at least one wall member of the container comprises the structural laminate described herein. The preferred laminate includes at least two metal layers and at least one layer of a metal-corroding composition which is positioned between the metal layers of the laminate. The corroding medium is a composition which, when contacted with moisture, will chemically corrode each of the metal layers.

DESCRIPTION OF A PREFERRED EMBODIMENT

Figure 1:
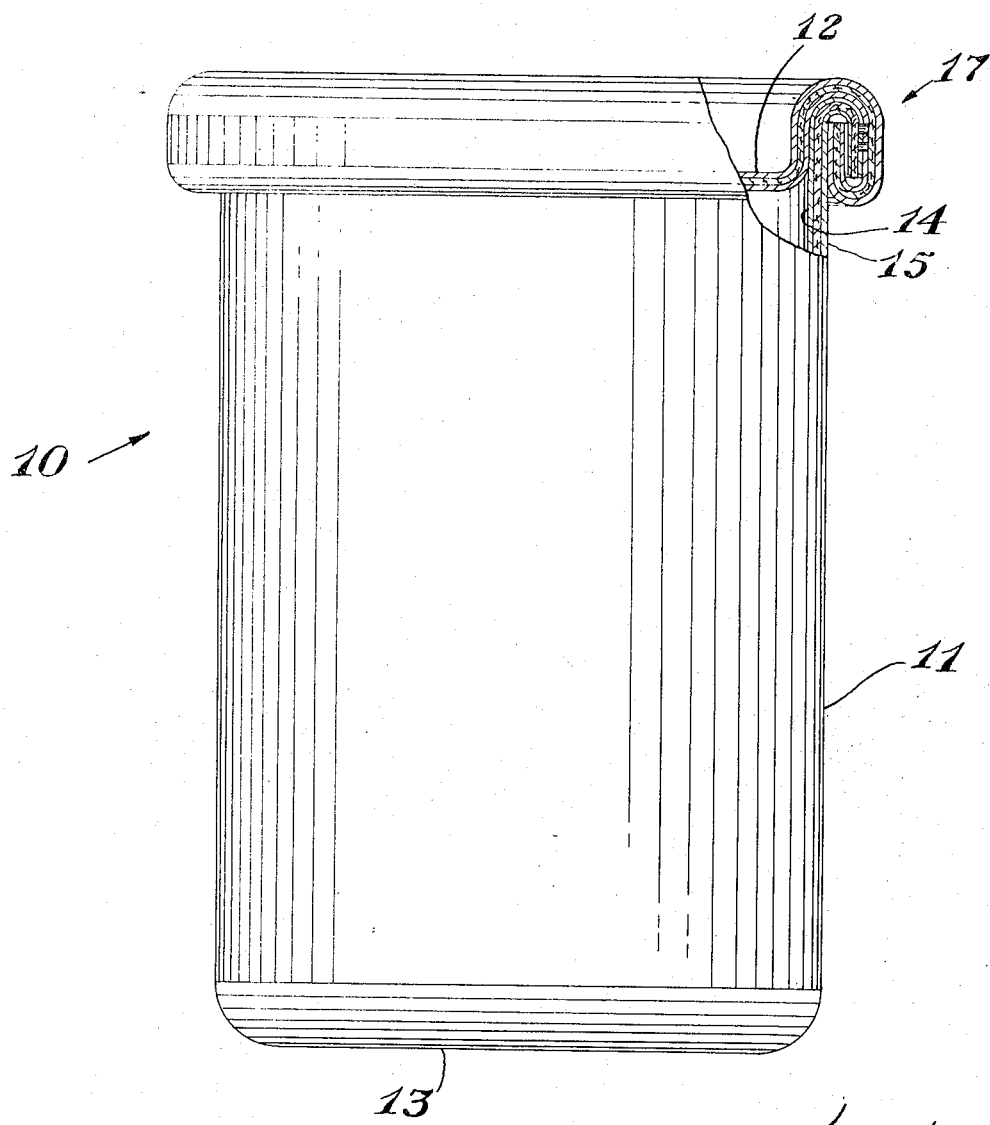
FIG. 1 is a front elevation view, partly in section, of a container fabricated from the structural laminate described herein.

In the drawing numeral 10 indicates generally a cylindrical metal container. Basically, container 10 comprises a side wall 11, a top wall 12 and a bottom wall 13. In the embodiment of the invention, as illustrated herein, the container walls comprise a three-layer structural laminate. The laminate is fabricated of at least two metal layers 14, 15, and at least one layer 16 of a metal-corroding composition, which is positioned between the metal layers. In fabricating the container 10, the joining of side wall 11 with top wall 12 forms a chime portion, indicated generally by numeral 17.

The metal layers of the laminate structure may be single metals, metal alloys, clad metals or the like. Preferably, each layer will be the same kind of metal, but the invention also contemplates a laminate structure utilizing layers of different metals, or individual layers of more than one metal, such as clad and galvanized metals. The choice of metals to be used will depend on such factors as the suitability of the metal for container fabrication, cost of the metal, strength requirements of the laminate structure, type of material to be packaged in the container, and the like. Alloys of iron, such as steel, and alloys of magnesium or aluminum are preferred in fabricating a laminate structure in which the same metal is used for each layer. For a laminate structure using layers of different metals, a typical example would be a layer of steel and a layer of an aluminum alloy.

With regard to the metal layers, it is preferred to use, in the case of aluminum, alloys containing at least 50% aluminum, and more preferably about 85% aluminum. Typical of the aluminum alloys which may be used are those compositions listed in the Registration Record of Aluminum Assoc. Alloy Designations and Chemical Compositions Limits for Wrought Aluminum Alloys. Particularly suitable compositions are those designated by the following Aluminum Assoc. numbers: 1100, 2017, 3002, 4045, 5052, 5056, 6061, 7075 and 8001. Preferred magnesium alloy compositions for use in the laminate structure are those which contain at least 50% magnesium and preferably about 85% magnesium. Especially suitable magnesium alloys are those listed by the American Society for Testing Materials under the following designations: MIA, AZ31B, A3A, AZ61A, AZ61B, AZ80A, ZK60A and ZE10A (see Metals Handbook, Amer. Soc. for Metals). Although thickness of the individual metal layers is not critical, the usual materials are metal foils less than one-eighth inch in thickness. Preferably, the container laminate, which includes the metal layers 14, 15, and the corroding composition 16, is a generally flexible structure having an over-all or total thickness of not more than about one-fourth inch.

Figure 2:
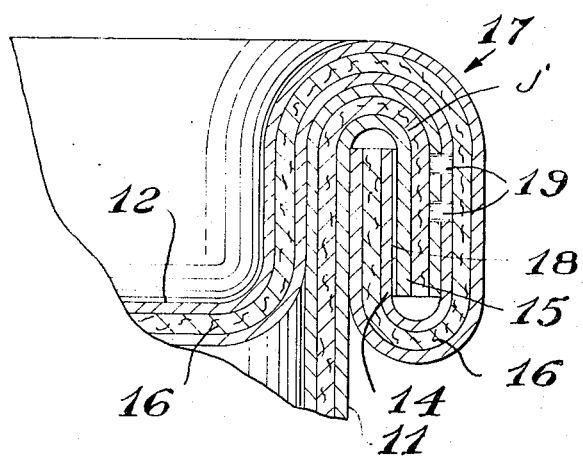
FIG. 2 is an enlarged section view of the chime portion of the container, as illustrated in FIG. 1.

In fabricating a container in which the same metal is used for each layer of the laminate structure, the inner layer 14 of top wall 12 and the outer layer 15 of side wall 11 are normally joined in face-to-face contact at a joint J within the chime portion (note FIG. 2). In fabricating a container in which different metals are employed for each layer in the laminate structure, such as steel and aluminum, for example, the layers are separated at joint J with a non-conductor material 18. The non-conductor material 18 prevents electron flow between the unlike metal layers and thereby precludes the possibility of galvanic corrosion of the container laminate. In general, any material capable of providing electrical insulation between the metal layers at joint J may be used. Conventional rubber-based adhesives are preferred.

In general, the metal corroding composition 16 may comprise any of the acids, bases or salts which, in a water solution, will chemically attack alloys of iron, magnesium or aluminum, but which in a dry condition are non-corrosive to metals. The preferred compositions are dry, water-soluble, inorganic metal and non-metal salts. Ammonium chloride is an especially preferred non-metal salt. Typical metal salts which may be used include ferric chloride, ferric sulphate, sodium chloride and magnesium chloride. Suitable acid compositions which may be used are organic acids, such as tartaric acid and citric acid. Representative of bases which may be used for the corroding composition are the soluble metal hydroxides, the preferred compounds being sodium hydroxide, potassium hydroxide, lithium hydroxide and barium hydroxide.

Positioning or layering of the metal corroding composition between the metal layers of the laminate structure may take several forms. For example, the corroding composition, in the form of discrete particles, may be adhered to the inner surfaces of the metal layers. In another form the discrete particles may be placed loosely between the metal layers. In still another form the composition may be impregnated onto a bibulous carrier material and the carrier strip sandwiched between the metal layers of the laminate. Use of a carrier strip impregnated with the corroding composition is preferred, since the bibulous carrier material can act as a wick to help carry moisture between the metal layers of the laminate after the container is opened.

Suitable carrier materials for the corroding composition include absorbent papers, such as paper toweling; water permeable hydrophilic adhesives, porous polymeric films, such as open-cell plastic films; and soluble polymeric films of water-soluble film formers, such as methylcellulose, hydroxyethyl cellulose, polyvinyl alcohol, polyvinylpyrolidone and polyvinyloxazolidone. It will be readily appreciated that the corroding composition must be sealed between the metal layers of the laminate to prevent the composition from coming into premature contact with moisture.

To initiate deterioration of the laminate, as in the walls of a discarded container, a preferred means of severing the laminate structure is a tear strip (not shown), which is integrally formed in top wall 12 of the container. Although a tear strip is preferred, any device which will effectively sever or puncture the container laminate, such as a can opener, may be used to achieve communication between the corroding composition and environmental moisture.

When the container laminate is severed and the composition is wetted with moisture, which may be provided as rain, snow, dew, condensate, atmospheric moisture, liquid from the contents of the container, or the like, a solution corrosive to the metal layers is formed. The resulting chemical corrosion usually initiates a simultaneous deterioration of each metal layer. However, with some combinations of metals and corroding media, particularly where different metals are employed, each metal layer may deteriorate at a different rate.

According to one embodiment of the invention, the carrier strip is held in place between the metal layers during fabrication of the laminate structure by an adhesive applied in spots to opposite sides of the strip. In general, any adhesive which will secure the carrier strip to the metal layer long enough to form the laminate structure is suitable. Typical adhesives which may be used are the solvent cements, such as Duco (brand) cement.

In the container embodiment illustrated herein, referring particularly to FIG. 2, it will be noted that perforations 19 extend completely through the innermost double metal layer joint formed in chime portion 17. Perforations 19 provide communication between top wall 12 and side wall 11 of the container, which enhances migration of moisture from the top wall to the side wall once the container laminate is severed. With regard to positioning of perforations 19, it will be appreciated that these openings must be placed at a point in the chime portion 17 which is sealed off from the contents of the container. Positioning of the perforations in the manner indicated in FIG. 2 will prevent any moisture in the container contents from contacting the corroding composition 16 before the container is opened, thus avoiding premature initiation of the corrosive reaction.

Additional embodiments of the invention include laminates and containers fabricated therefrom in which the laminate is a multi-layer structure comprising more than two metal layers and one or more metal-corroding compositions positioned between each pair of metal layers.

The following examples are given to illustrate the invention, but are not to be construed as limiting the invention to the embodiments described herein.

EXAMPLE I

A sheet of paper towel measuring approximately 3 in. square was soaked in a saturated aqueous solution of ammonium chloride and the salt-impregnated paper sheet was dried at room temperature. A sheet of steel measuring about 3 in. square and 0.007 in. thick was adhered to one side of the paper sheet by applying spots of Duco cement at various places between the metal and the paper. A second sheet of steel, of the same dimensions, was adhered to the opposite side of the paper sheet, to complete the three-layer laminate.

The laminate structure was cut into two separate sections, each section measuring about 1½ in. wide and 3 in. long. One section was stood upright in a shallow pool of water to wet the paper layer exposed along the bottom edge of the section and the section was allowed to stand in the water for about three months. After two weeks the laminate section standing in water was observed to be severely corroded. At the end of three months the metal layers had completely converted to a corrosive residue. The other laminate section was allowed to lay on a bench at room temperature for the same three-month period. At the end of the period no visible evidence of corrosion could be detected on the section which had lain on the bench.

EXAMPLE II

A sheet of paper towel about 2 in. wide and 3 in. long was soaked in a saturated aqueous solution of tartaric acid and dried at room temperature. To one side of the paper sheet was cemented a sheet of magnesium alloy (AZ61) about 2 in. wide, 3 in. long and 0.003 in. thick. An identical sheet of magnesium alloy was adhered to the opposite side of the paper sheet, to complete the three layer laminate.

The laminate structure was cut into two separate sections, each section measuring about 1 in. wide and 3 in. long. Following the procedure of Example I, one section was placed on edge in water and held in this position for about 2 days. For the same two-day period the other section was allowed to lay on a bench at room temperature. At the end of two days each section was checked for corrosion. Both metal layers of the laminate section which had stood in water were badly corroded. No corrosion was visible on the section which had lain on the bench.

EXAMPLE III

A sheet of paper towel about 2 in. wide and 3 in. long was soaked in a saturated aqueous solution of ammonium chloride and dried at room temperature. A sheet of magnesium alloy (AZ61) about 2 in. wide, 3 in. long and 0.003 in. thick was cemented to one side of the paper sheet. An identical sheet of magnesium alloy was adhered to the opposite side of the paper sheet to complete the three layer laminate.

The laminate structure was cut into two separate sections, each section measuring about 1 in. wide and 3 in. long. In the manner described in Example I, one section was stood on edge in water and held in this position for about 24 hours. The other section was allowed to lay on a bench at room temperature for the same 24-hour period. At the end of 24 hours the metal layers of the section standing in water had been almost completely consumed by corrosion. The section which had lain on the bench was examined and no corrosion could be detected.

What is claimed is:

1. A metal structural laminate comprising:

a. at least two metal layers; and
b. at least one layer of a metal-corroding composition positioned between the metal layers, said composition being capable, when contacted with moisture, of chemically corroding each of the metal layers.

2. The structural laminate of claim 1 in which each metal layer is comprised of the same metal.

3. The structural laminate of claim 1 in which the metal layers are dissimilar metals, the said layers being separated by a non-conducting material.

4. The structural laminate of claim 1 in which the over-all thickness of the laminate is not more than about one-fourth inch.

5. The structural laminate of claim 1 in which the metal-corroding composition is sealed from the atmosphere.

6. The structural laminate of claim 1 in which the metal-corroding composition is impregnated into a strip of bibulous material.

7. The structural laminate of claim 1 in which the metal-corroding composition is a dry, water-soluble salt.

8. The structural laminate of claim 1 in which the metal layers are ferrous alloy metals and the corroding composition is ammonium chloride.

9. The structural laminate of claim 1 in which one of the metal layers is a ferrous alloy metal, the other metal layer is an aluminum-based metal and the corroding composition is ferric chloride.

* * * * *